US012307756B2

(12) United States Patent
Goldin et al.

(10) Patent No.: US 12,307,756 B2
(45) Date of Patent: May 20, 2025

(54) FAST OBJECT DETECTION IN VIDEO VIA SCALE SEPARATION

(71) Applicant: SAMSUNG ELECTRONICS CO., LTD., Suwon-si (KR)

(72) Inventors: Ishay Goldin, Tel-Aviv (IL); Netanel Stein, Tel-Aviv (IL); Alexandra Dana, Tel-Aviv (IL); Alon Intrater, Tel-Aviv (IL); David Tsidkiahu, Tel-Aviv (IL); Nathan Levy, Tel-Aviv (IL); Omer Shabtai, Tel-Aviv (IL); Ran Vitek, Tel-Aviv (IL); Tal Heller, Tel-Aviv (IL); Yaron Ukrainitz, Tel-Aviv (IL); Yotam Platner, Tel-Aviv (IL); Zuf Pilosof, Tel-Aviv (IL)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 278 days.

(21) Appl. No.: 17/663,035

(22) Filed: May 12, 2022

(65) Prior Publication Data

US 2023/0368520 A1     Nov. 16, 2023

(51) Int. Cl.
    *G06V 10/96*         (2022.01)
    *G06T 3/4046*       (2024.01)
    (Continued)

(52) U.S. Cl.
    CPC ............ *G06V 10/96* (2022.01); *G06T 3/4046* (2013.01); *G06V 10/774* (2022.01); *G06V 10/82* (2022.01);
    (Continued)

(58) Field of Classification Search
    CPC .... G06T 3/4046; G06V 10/774; G06V 10/82; G06V 10/96; G06V 20/10; G06V 20/41; G06V 20/49; G06V 20/70
    See application file for complete search history.

(56) References Cited

U.S. PATENT DOCUMENTS 8,977,000 B2    3/2015   Yano
10,628,961 B2 *   4/2020   Sundaresan ............... G06T 7/20
(Continued)

FOREIGN PATENT DOCUMENTS

JP       2021-072592      5/2021
WO     2014101036       6/2017

OTHER PUBLICATIONS

Xiang Yan et al., "Self-Supervised Learning to Detect Key Frames in Videos," Dec. 4, 2020, Sensors 2020, 20, 6941; doi: 10.3390/s20236941, pp. 1-14.*

(Continued)

*Primary Examiner* — Omar S Ismail
(74) *Attorney, Agent, or Firm* — MORGAN, LEWIS & BOCKIUS LLP

(57) ABSTRACT

Techniques and apparatuses enabling high accuracy video object detection using reduced system resource requirements (e.g., reduced computational load, shallower neural network designs, etc.) are described. For example, a search domain of an object detection scheme (e.g., a target object class, a target object size, a target object rotation angle, etc.) may be separated into subdomains (e.g., such as subdomains of object classes, subdomains of object sizes, subdomains object rotation angles, etc.). Specialized, subdomain-level object detection/segmentation tasks may then be separated across sequential video frames. As such, different subdomain-level processing techniques (e.g., via specialized neural networks) may be implemented across different frames of a video sequence. Moreover, redundancy information of consecutive video frames may be leveraged, such that specialized object detection tasks combined with visual object tracking across consecutive frames may enable more efficient (e.g., more accurate, less computationally intensive, (Continued)

etc.) full domain object detection and object segmentation schemes.

20 Claims, 7 Drawing Sheets

(51) Int. Cl.
  *G06V 10/774* (2022.01)
  *G06V 10/82* (2022.01)
  *G06V 20/40* (2022.01)
  *G06V 20/70* (2022.01)
(52) U.S. Cl.
  CPC .............. *G06V 20/41* (2022.01); *G06V 20/49* (2022.01); *G06V 20/70* (2022.01)

(56) References Cited

U.S. PATENT DOCUMENTS

| | | | |
|---|---|---|---|
| 10,701,394 | B1 | 6/2020 | Caballero et al. |
| 10,733,714 | B2* | 8/2020 | El-Khamy ................ G06T 3/18 |
| 10,891,525 | B1 | 1/2021 | Olgiati et al. |
| 10,984,246 | B2 | 4/2021 | Ramaswamy et al. |
| 2002/0102024 | A1 | 8/2002 | Jones et al. |
| 2018/0225820 | A1* | 8/2018 | Liang ...................... G06V 10/82 |
| 2019/0251702 | A1* | 8/2019 | Chandler ................ G10L 15/24 |
| 2019/0311202 | A1* | 10/2019 | Lee .......................... G06T 9/002 |
| 2020/0293783 | A1* | 9/2020 | Ramaswamy ......... G06F 18/256 |
| 2020/0293828 | A1* | 9/2020 | Wang ........................ G06N 3/04 |
| 2020/0349686 | A1 | 11/2020 | Shapovalova et al. |
| 2020/0364554 | A1* | 11/2020 | Wang ........................ G06T 7/11 |
| 2021/0012503 | A1* | 1/2021 | Cho ........................ G06F 18/24 |
| 2021/0046861 | A1* | 2/2021 | Li ............................ G06V 10/30 |
| 2021/0073525 | A1* | 3/2021 | Weinzaepfel ....... G06F 18/2431 |
| 2021/0100526 | A1* | 4/2021 | Schein .................. A61B 8/5215 |
| 2021/0149441 | A1* | 5/2021 | Bartscherer ........... G06F 1/1616 |
| 2021/0152739 | A1 | 5/2021 | Lu et al. |
| 2021/0213973 | A1* | 7/2021 | Carillo Peña .......... G06N 3/063 |
| 2021/0374947 | A1* | 12/2021 | Shin ..................... G06V 10/776 |
| 2022/0035684 | A1* | 2/2022 | Gupte ................... G06F 9/5083 |
| 2022/0055689 | A1* | 2/2022 | Mandlekar ......... B60W 60/0025 |
| 2022/0215232 | A1* | 7/2022 | Pardeshi ................ G06N 3/006 |
| 2022/0238012 | A1* | 7/2022 | Ghadiok .............. G08G 1/0116 |
| 2022/0269888 | A1* | 8/2022 | Stoeva .................. G06T 19/006 |
| 2022/0414928 | A1* | 12/2022 | Venkataraman ..... G06V 10/145 |
| 2023/0021926 | A1* | 1/2023 | Zhao .................... G06V 10/751 |
| 2023/0042004 | A1* | 2/2023 | Kumar ............. G06F 18/24133 |

OTHER PUBLICATIONS

Chen Zhang et al.,"Video Object Detection With Two-Path Convolutional LSTM Pyramid," Aug. 28, 2020, IIEEE Access, vol. 8, 2020,pp. 151681-151689.*

Chun-Han Yao et al.,"Video Object Detection via Object-Level Temporal Aggregation," Nov. 13, 2020, Computer Vision—ECCV 2020 ,pp. 160-166.*

Mason Liu et al.,"Looking Fast and Slow: Memory-Guided Mobile Video Object Detection," Mar. 25, 2019, pararXiv: 1903.10172v1 [cs.CV],pp. 1-8.*

Hao Luo et al.,"Detect or Track: Towards Cost-Effective Video Object Detection/Tracking," Jul. 17, 2029, The Thirty-Third AAAI Conference on Artificial Intelligence (AAAI-19), vol. 33 No. 01: AAAI-19, IAAI-19, EAAI-20 ,pp. 8803-8809.*

Ozgur Erkent et al.,"Semantic Grid Estimation with a Hybrid Bayesian and Deep Neural Network Approach," Jan. 6, 2019,2018 IEEE/RSJ International Conference on Intelligent Robots and Systems (IROS) Madrid, Spain, Oct. 1-5, 2018,pp. 888-893.*

Hao Long et al.,"Object Detection in Aerial Images Using Feature Fusion Deep Networks," Mar. 25, 2019,IEEE Access , vol. 7,2019, pp. 30980-30988.*

Kai Chen et al.,"Optimizing Video Object Detection via a Scale-Time Lattice," Jun. 2018, Proceedings of the IEEE Conference on Computer Vision and Pattern Recognition (CVPR), 2018,pp. 7814-7820.*

Chin, et al., "Adascale: Towards Real-Time Video Object Detection Using Adaptive Scaling", Proceedings of the 2nd SysML Conference, arXiv preprint arXiv:1902.02910v1 [cs.CV] Feb. 8, 2019 (18 pages).

Luo, et al., "Detect or Track: Towards Cost-Effective Video Object Detection/Tracking", arXiv preprint arXiv:1811.05340v1 [cs.CV] Nov. 13, 2018, 9 pages.

Yang, et al., "Face Detection through Scale-Friendly Deep Convolutional Networks" arXiv preprint arXiv:1706.02863v1 [cs.CV] Jun. 9, 2017, 12 pages.

Chen, et al., "Optimizing Video Object Detection via a Scale-Time Lattice", arXiv preprint arXiv:1804.05472v1 [cs.CV] Apr. 16, 2018 (10 pages).

Viola, et al., "Rapid Object Detection using a Boosted Cascade of Simple Features", Accepted Conference on Computer Vision and Pattern Recognition 2001, pp. 1-9.

Yau, et al., "Video Object Detection via Object-level Temporal Aggregation" (17 pages).

* cited by examiner

FAST OBJECT DETECTION IN VIDEO VIA SCALE SEPARATION

BACKGROUND

The following relates generally to image processing, and more specifically to fast object detection in video via scale separation.

The use of image capture devices, which may include still image cameras, moving image cameras or other electronic devices that include cameras or image sensors, has rapidly increased in recent years along with advancements in camera technology. For example, mobile communication terminals, such as cell phones, smartphones, portable computers, tablet computers, and other similar electronic devices may commonly include digital cameras. Further, higher quality and less expensive cameras are available to consumers and camera users due to such advancements in camera technology.

With advancements in digital camera technology, existing analog camera functions have been digitized, and the scope of digital camera technology has been expanded to a variety of new fields. Digital cameras may use image sensors (e.g., to capture images) and image signal processors (e.g., to process the captured images). Image signal processors may perform tasks on image output features, such as image segmentation tasks, image sharpening tasks, noise reduction tasks, color control tasks, etc.

For instance, object detection generally refers to image processing tasks (e.g., or video processing tasks) for detecting one or more objects in digital image data. As pixel quantities of image sensors increase, image processing speed and object detection accuracy become more important. Due to resource constraints of mobile electronic devices (e.g., device memory constraints, device computation constraints, power consumption, etc.), real-time object detection on mobile electronic devices is challenging. Accordingly, there is a need in the art for efficient object detection techniques.

SUMMARY

A method, apparatus, non-transitory computer readable medium, and system for fast object detection in video via scale separation are described. One or more aspects of the method, apparatus, non-transitory computer readable medium, and system include dividing a video into a plurality of frames including a first frame and a second frame; generating first object information for a first object in the first frame using a first neural network trained to operate on a first domain; generating second object information for a second object in the second frame using a second neural network trained to operate on a second domain; and generating label data for the video including a first label based on the first object information and a second label based on the second object information.

A method, apparatus, non-transitory computer readable medium, and system for fast object detection in video via scale separation are described. One or more aspects of the method, apparatus, non-transitory computer readable medium, and system include identifying first training data corresponding to a first domain; training a first neural network to perform a first computer vision task using the first training data; identifying second training data corresponding to a second domain; training a second neural network to perform a second computer vision task using the second training data; and alternately applying the first neural network and the second neural network to frames of a video to generate label data corresponding to both the first domain and the second domain.

An apparatus, system, and method for fast object detection in video via scale separation are described. One or more aspects of the apparatus, system, and method include a frame selection component to divide a video into a plurality of frames including a first frame and a second frame; a first neural network configured to generate first object information for a first object in the first frame, wherein the first neural network is trained to operate on a first domain; a second neural network configured to generate second object information for a second object in the second frame, wherein the second neural network is trained to operate on a second domain; and a data synthesis component configured to generate label data for the video including a first label based on the first object information and a second label based on the second object information.

DETAILED DESCRIPTION

Figure 1:
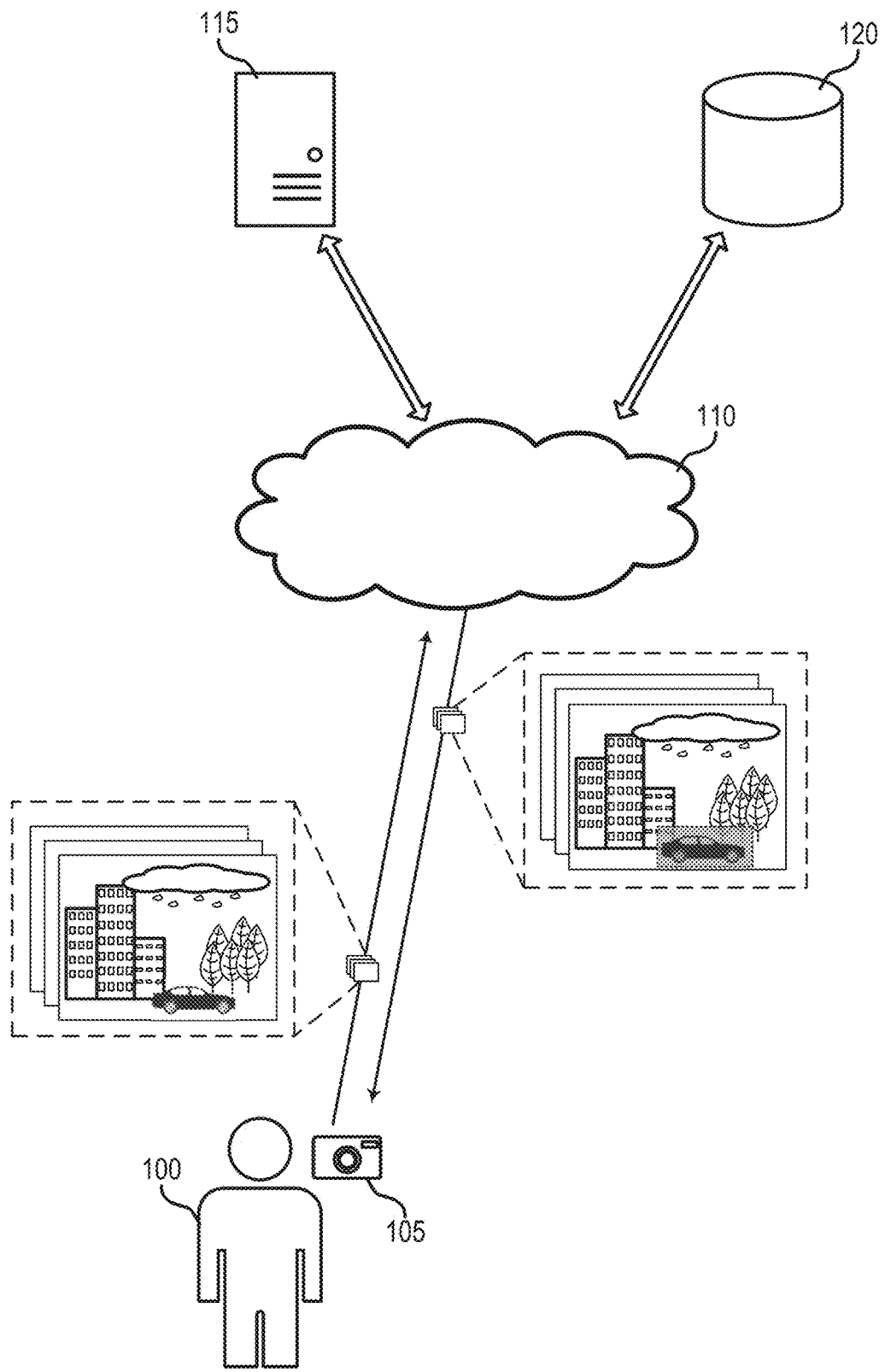
FIG. 1 shows an example of an image processing system according to aspects of the present disclosure.

Digital cameras may use image sensors (e.g., to capture images) and image signal processing techniques (e.g., to process the captured images). For instance, image processing techniques that may be performed on captured images include image sharpening, noise reduction, color control, image segmentation, and object detection, among various other specialized tasks.

Object detection is a computer technology related to image processing and computer vision that includes tasks directed to detecting instances of semantic objects in digital images and videos (e.g., where object detection tasks may typically be configured to detect objects of a certain class, such as humans, buildings, cars, etc.). Object detection has applications in numerous areas of computer vision, including video surveillance (e.g., facial recognition), image retrieval, autonomous vehicles safety systems (e.g., pedestrian detection), etc.

Machine learning-based object detection methods may provide high accuracy object detection results. However, some object detection techniques implementing artificial neural networks (e.g., deep neural networks) may require significant system resources such as complex computational capabilities, increased computational hardware, increased memory, increased power consumption, etc. As such, there is a need in the art for accurate, real-time object detection on resource limited devices, such as cameras, mobile phones, etc.

The techniques and apparatuses described herein enable high accuracy object detection techniques with decreased system resource requirements (e.g., with decreased computational load, shallower neural network designs, etc.). For example, one or more aspects of the described techniques include separation of specialized object detection/segmentation tasks across sequential video frames. As such, different processing schemes (e.g., specialized neural networks) may be implemented across different frames of a video sequence, and redundancy information of consecutive video frames may be leveraged, to enable more efficient object detection and object segmentation (e.g., while increasing object detection accuracy, while using reduced computational resources, etc.).

For instance, object detection schemes may be implemented based on one or more search domains (e.g., a target object class, a target object size, a target object rotation angle, etc.). As such, a search domain underlying an object detection scheme may depend on a particular application (e.g., a search domain of a security application may include a human face target object class, an object size or object shape of a human face, etc.). According to one or more aspects of techniques described herein, search domains of object detection schemes may be separated into subdomains (e.g., such as subdomains of object classes, subdomains of object sizes, subdomains object rotation angles, etc.). Each frame in a video sequence may then be processed (e.g., searched) on a subdomain-level, where the full search domain of the object may be accounted for and covered over several sequential frames (e.g., via alternating subdomain-level processing and leveraging of redundancy information of consecutive video frames).

As an example, object detection tasks for a first subset of video frames may be specialized for small objects, such that higher resolution images may be processed via a relatively shallow neural network. On the other hand, object detection tasks for a second subset of video frames may be specialized for larger objects, such that lower resolution images may be processed via a relatively deep neural network. In such an example, image processing systems (e.g., video object detection systems) may be specifically optimized for separated detection target tasks, such as by efficiently implementing high-resolution images/shallow neural networks for small object detection tasks and low-resolution images/deep neural networks for large object detection tasks.

Accordingly, by applying the described unconventional techniques of separating the search domain across sequential frames and narrowing down the search domain per frame (e.g., performing object detection tasks at the subdomain-level per frame), neural networks that are more specifically tailored for more limited tasks may be implemented by object detection systems (e.g., which enables efficient and accurate object detection scheme by resource limited devices).

Embodiments of the present disclosure may be used in the context of an image (e.g., a video) processing system. For example, a camera apparatus based on the present disclosure may implement different object detection tasks across different frames of a video sequence, as well as leverage specialized networks (e.g., neural networks specialized for certain object detection tasks in different frames of the video sequence), according to techniques described herein. An example of an application of the inventive concept in the image processing context is provided with reference to FIGS. 1 and 2. Details regarding the architecture of an example object detection system are provided with reference to FIGS. 3 and 4. Example object detection task separation processes are provided with reference to FIGS. 5 and 6. One or more aspects of system training (e.g., one or more aspects of training specialized neural networks for certain object detection tasks) are described with reference to FIG. 7.

Image Processing System

FIG. 1 shows an example of an image processing system according to aspects of the present disclosure. The example shown includes user 100, device 105 (e.g., a camera), cloud 110, image processing apparatus 115, and database 120. In some examples, a user 100 may use a device 105 that may be in communication with image processing apparatus 115 (e.g., via cloud 110) to perform one or more image processing tasks (e.g., such as object detection tasks for a video frame sequence). Image processing apparatus 115 is an example of, or includes aspects of, the corresponding element described with reference to FIG. 3.

In the example of FIG. 1, device 105 may perform object detection tasks (e.g., for a video frame sequence) to output an annotated video. For instance, in the example of FIG. 1, device 105 may output a video with an object (e.g., a vehicle) indicated via an object bounding box.

FIG. 1 illustrates an example image processing system implementing one or more aspects of video object detection techniques described herein, which may provide for more accurate object detection while requiring reduced system resource requirements (e.g., reduced computational load, shallower neural network designs, etc.). For example, a search domain of an object detection scheme (e.g., a target object class, a target object size, a target object rotation angle, etc.) may be separated into subdomains (e.g., such as subdomains of object classes, subdomains of object sizes, subdomains object rotation angles, etc.). Specialized subdomain-level object detection/segmentation tasks may then be separated across sequential video frames. As such, different subdomain-level processing techniques (e.g., via specialized neural networks) may be implemented across different frames of a video sequence. Moreover, redundancy information of consecutive video frames may be leveraged, such that specialized object detection tasks combined with visual object tracking across consecutive frames may enable more efficient (e.g., more accurate, less computationally intensive, etc.) full domain object detection and object segmentation schemes.

One or more aspects of the present disclosure may be applied in various technical fields, such as image processing, computer vision, etc. For instance, described apparatuses and techniques may enable efficient object detection and object segmentation (e.g., instance level semantic segmentation) in video applications, internet of things (IoT) applications, automatic surveillance systems, smart/autonomous vehicles, mobile cameras, robots, augmented reality (AR) applications, virtual reality (VR) applications, etc. In some cases, object detection and object segmentation techniques may be based on (e.g., or implement) deep neural networks that may require significant computational resources. The present disclosure may enable engines (e.g., image processing system hardware) to process video streams more efficiently, using limited (e.g., or reduced) computational resources.

A computing device may be a personal computer, laptop computer, mainframe computer, palmtop computer, personal assistant, mobile device, or any other suitable processing apparatus. A device 105 may include an optical instrument (e.g., an image sensor, camera, etc.) for recording or capturing images, which may be stored locally, transmitted to another location, etc. For example, an image sensor may capture visual information using one or more photosensitive elements that may be tuned for sensitivity to a visible spectrum of electromagnetic radiation. The resolution of such visual information may be measured in pixels, where each pixel may relate an independent piece of captured information. In some cases, each pixel may thus correspond to one component of, for example, a two-dimensional (2D) Fourier transform of an image. Computation methods may use pixel information to reconstruct images captured by the device 105. In a camera device, an image sensor may convert light incident on a camera lens into an analog or digital signal. An electronic device may then display an image on a display panel based on the digital signal. Image sensors are commonly mounted on electronics such as smartphones, tablet personal computers (PCs), laptop PCs, and wearable devices.

A pixel (e.g., a pixel sensor) may store information about received electromagnetic radiation (e.g., light). Each pixel may include one or more photodiodes and one or more complementary metal oxide semiconductor (CMOS) transistors. A photodiode may receive a light and may output charges. The amount of output charges may be proportional to the amount of light received by the photodiode. CMOS transistors may output a voltage based on charges output from the photodiode. A level of a voltage output from a photodiode may be proportional to the amount of charges output from the photodiode. That is, a level of a voltage output from a photodiode may be proportional to the amount of light received by the photodiode.

In some examples, image processing apparatus 115 may include, or may be implemented via, a server. A server provides one or more functions to users 100 linked by way of one or more of the various networks. In some cases, the server includes a single microprocessor board, which includes a microprocessor responsible for controlling all aspects of the server. In some cases, a server uses microprocessor and protocols to exchange data with other devices 105/users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a super computer, or any other suitable processing apparatus.

In digital image processing and computer vision, image segmentation is the process of partitioning a digital image into multiple segments (sets of pixels, also known as image objects). The goal of segmentation is to simplify and/or change the representation of an image into something that is more meaningful and easier to analyze. Image segmentation is typically used to locate objects and boundaries (lines, curves, etc.) in images. More precisely, image segmentation is the process of assigning a label to every pixel in an image such that pixels with the same label share certain characteristics.

Object detection refers to a computer-implemented program to classify objects using categorical labels and localize objects present in input images. Object detection can be performed and evaluated by mean average precision, a metric taking into account a quality of classification and localization. In some examples, computer vision applications perform object detection to analyze image data, e.g., to identify people or objects in an image.

Visual object detection tasks may include identifying the location of a target object in a digital image. In some cases, a target object's location may be defined as being included or contained in a bounding area (e.g., such as a bounding box or bounding polygon). For instance, in some examples, a bounding box regressor may be configured to determine information related to a location of an object in an image. For example, information related to a location of an object may relate to a position and/or a size of a rectangular bounding box encompassing detected image. In the example of FIG. 1, the information related to the location of the detected object may include coordinates of four vertexes of a rectangular bounding box encompassing an object (e.g., a vehicle) in the input image. Additionally or alternatively, a target object's location may be defined as a segmentation map of pixels, or may be defined as various other representation methods. All of such tasks, and similar image processing tasks, may generally be referred to as object detection, where some representation of a target object's location is sought through image (e.g., video) processing techniques.

In some aspects, device 105 may communicate with image processing apparatus 115 via cloud 110. A cloud 110 is a computer network configured to provide on-demand availability of computer system resources, such as data storage and computing power. In some examples, the cloud 110 provides resources without active management by the user 100. The term cloud 110 is sometimes used to describe data centers available to many users 100 over the Internet. Some large cloud networks have functions distributed over multiple locations from central servers. A server is designated an edge server if it has a direct or close connection to a user 100. In some cases, a cloud 110 is limited to a single organization. In other examples, the cloud 110 is available to many organizations. In one example, a cloud 110 includes a multi-layer communications network comprising multiple edge routers and core routers. In another example, a cloud 110 is based on a local collection of switches in a single physical location.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user 100 interacts with database controller. In other cases, database controller may operate automatically without user interaction.

In some cases, the techniques described herein may be implemented in VR applications. VR is a computer technology that generates an artificial sensory environment for a user 100. In some cases, VR systems use virtual reality headsets, sometimes in combination with physical spaces or multi-projected environments, to generate realistic images, sounds and other sensations that simulates a user's physical presence in a virtual or imaginary environment. A person using virtual reality equipment is able to "look around" the artificial world, and with high-quality VR move about in it and interact with virtual features or items. VR headsets are head-mounted goggles with a screen in front of the eyes. Programs may include audio and sounds through speakers or headphones. VR systems that include transmission of vibrations and other sensations to the user 100 through a game controller or other devices are known as haptic systems. This tactile information is generally known as force feedback in medical, video gaming and military training applications. Virtual reality also refers to remote communication environments which provide a virtual presence of users through telepresence and telexistence or the use of a virtual artifact (VA). The immersive environment can be similar to the real world in order to create a lifelike experience grounded in reality or sci-fi. Augmented reality systems may also be considered a form of VR that layers virtual information over a live camera feed into a headset, or through a smartphone or tablet device. Modern VR displays may be based on technology developed for smartphones including: gyroscopes and motion sensors for tracking head, hand, and body positions; small HD screens for stereoscopic displays; and small, lightweight and fast processors. Production of VR images and video may be facilitated by the use of omnidirectional cameras, also known as 360-degree cameras or VR cameras, that have the ability to record in all directions, although at low-resolutions or in highly compressed formats for online streaming. In contrast, photogrammetry is increasingly used to combine several high-resolution photographs for the creation of detailed 3D objects and environments in VR applications.

Figure 2:
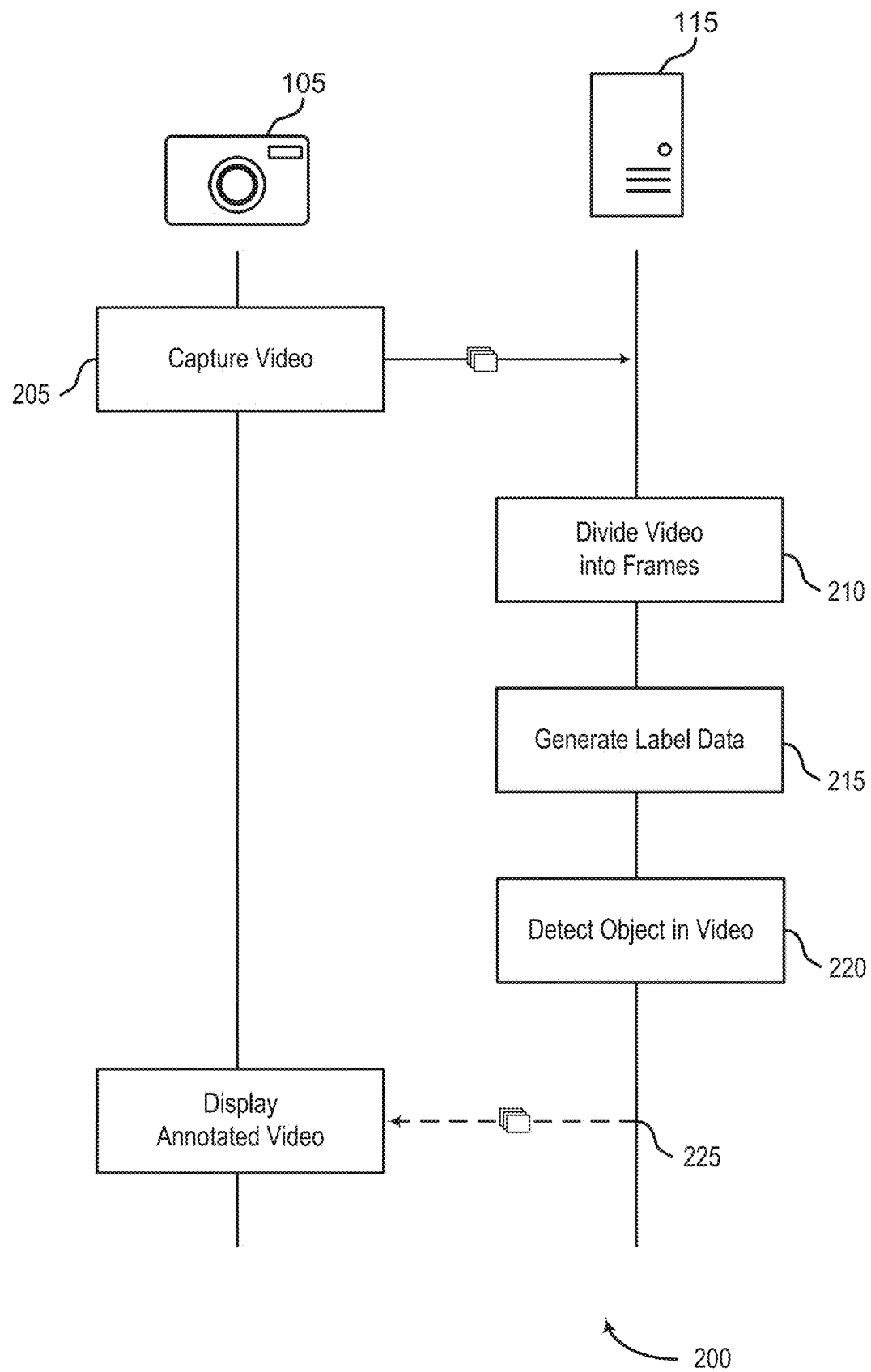
FIG. 2 shows an example of a process for object detection in video according to aspects of the present disclosure.

FIG. 2 shows an example of a process 200 for object detection in video according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Process 200 illustrates aspects of described high accuracy object detection techniques that may be implemented with reduced system resource requirements (e.g., with minimal/efficient computational load, with shallower neural network designs, etc.). For example, one or more aspects of the described techniques include separation of specialized object detection/segmentation tasks across sequential video frames. As such, different processing schemes (e.g., specialized neural networks) may be implemented across different frames of a video sequence to enable more efficient object detection and object segmentation (e.g., while increasing object detection accuracy, while using reduced computational resources, etc.).

At operation 205, the system captures a video (e.g., capture or record a series of image frames using an image sensor). In some cases, the operations of this step refer to, or may be performed by, a device as described with reference to FIG. 1. For instance, the system may capture a video of a vehicle (e.g., a moving vehicle) via a device 105.

At operation 210, the system divides the captured video into at least two frames. In some cases, the operations of this step refer to, or may be performed by, an image processing apparatus as described with reference to FIGS. 1 and 3. In some cases, the operations of this step refer to, or may be performed by, frame selection component as described with reference to FIGS. 3 and 4.

At operation 215, the system detects objects in the frames based on object information for the different frames (e.g., where first object information for a first object in the first frame is generated using a first neural network trained to operate on a first domain, and second object information for a second object in the second frame is generated using a second neural network trained to operate on a second domain). In some cases, multiple different semantic objects are detected by different neural networks, but the different objects might appear in both frames. In some cases, the operations of this step refer to, or may be performed by, an image processing apparatus as described with reference to FIGS. 1 and 3. In some cases, the operations of this step refer to, or may be performed by, data synthesis component as described with reference to FIG. 3.

At operation 220, the system detects an object in the video frames (e.g., the system detects a location and identity of a same target object across frames in the video) based on the generated label data for individual frames. In some cases, the operations of this step refer to, or may be performed by, an image processing apparatus as described with reference to FIGS. 1 and 3.

At operation 225, the system provides (e.g., display) an annotated video based on the detected location of the target object (e.g., display an annotated video indicating, or altering, the target object). In some cases, the operations of this step refer to, or may be performed by, a device as described with reference to FIG. 1. For instance, the system may annotate the video of the vehicle (e.g., a moving vehicle) captured by a device 105, such that the annotated video includes a bounding box surrounding the detected vehicle object. In some cases, the operations of this step refer to, or may be performed by, a display as described with reference to FIGS. 3 and 4.

Generally, any aspects of the described techniques may be performed at the image processing apparatus 115, at the device 105, or both. For instance, in the example of FIG. 2, aspects of object detection techniques described herein (e.g., techniques for separation of object detection tasks and object segmentation tasks across a sequence of image frames) may be described as being performed at a separate image processing apparatus (e.g., an image processing apparatus 115 separate from device 105), where a device (e.g., device 105) may be connected to the image processing apparatus 115 via a cloud. However, such an example is illustrated and described for exemplary purposes, and is not intended to be limiting in terms of the scope of the present disclosure. For instance, in some examples, device 105 and image processing apparatus 115 may be a single device (e.g., an image sensor, device 105, image processing apparatus 115, etc. may be implemented via a single device/apparatus, may operate independently online or offline, etc.).

Object Detection System Architecture

Figure 3:
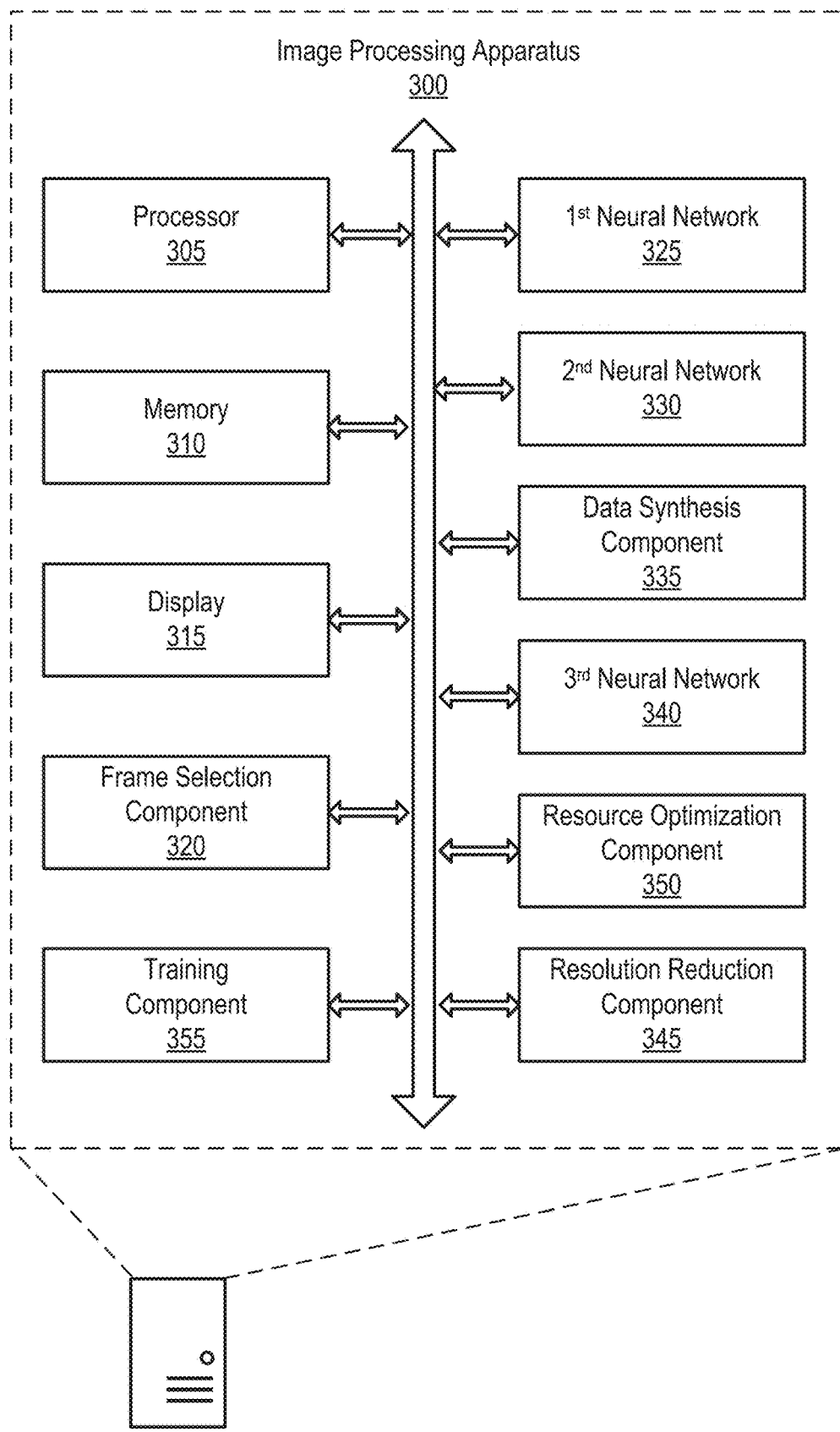
FIG. 3 shows an example of an image processing apparatus according to aspects of the present disclosure.

FIG. 3 shows an example of an image processing apparatus 300 according to aspects of the present disclosure. Image processing apparatus 300 is an example of, or includes aspects of, the corresponding element described with reference to FIG. 1. In one aspect, image processing apparatus 300 includes processor 305, memory 310, display 315, frame selection component 320, first neural network 325, second neural network 330, data synthesis component 335, third neural network 340, resolution reduction component 345, resource optimization component 350, and training component 355. In some examples, training may be performed offline and the training component 355 may be a component of a different apparatus that trains the image processing apparatus 300.

As described herein, in some cases, image processing apparatus 300 may communicate with an image sensor or a device including an image sensor (e.g., as described with reference to FIG. 1). In other cases, image processing apparatus 300 may itself include an image sensor and may perform the described techniques independently/offline (e.g., image processing apparatus 300 and an image sensor/device 105 may be a single device).

According to the techniques described herein, image processing apparatus 300 may separate specialized object detection/segmentation tasks that are alternately performed over individual frames of a video frame sequence. That is, image processing apparatus 300 may perform different processing schemes (e.g., via specialized neural networks, such as first neural network 325, second neural network 330, and third neural network 340) according to configurable object detection task processing frequencies across a sequence of video frames. For example, first neural network 325 may perform a first object detection task every $N_1$ frames, second neural network 330 may perform a second object detection task every $N_2$ frames, etc. (e.g., as described in more detail herein, for example, with reference to FIGS. 4 and 5).

Frame selection component 320 may divide a video into a plurality of frames including a first frame and a second frame. First neural network 325 may be configured to generate first object information for a first object in the first frame, where the first neural network 325 is trained to operate on a first domain. Second neural network 330 may be configured to generate second object information for a second object in the second frame, where the second neural network 330 is trained to operate on a second domain. Training component 355 may be configured to train the first neural network 325 and the second neural network 330 (e.g., as described in more detail herein, for example, with reference to FIG. 7). In some examples, the second neural network 330 has fewer parameters than the first neural network 325. In some examples, third neural network 340 may be configured to generate third object information for a third object in a third frame, where the third neural network 340 is trained to operate on a third domain (e.g., where the third neural network 340 may also be trained via training component 355).

Data synthesis component 335 may be configured to generate label data for the video including a first label based on the first object information and a second label based on the second object information. Resolution reduction component 345 may be configured to reduce the resolution of the second frame to obtain a low-resolution version of the second frame, wherein the second neural network 330 takes the low-resolution version as input and the first neural network 325 takes a high-resolution version of the first frame as input. Resource optimization component 350 may be configured to identify available system resources for generating the label data and to select a frequency for applying the first neural network 325 and the second neural network 330 based on the available system resources.

A processor 305 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor 305 is configured to operate a memory 310 array using a memory controller. In other cases, a memory controller is integrated into the processor 305. In some cases, the processor 305 is configured to execute computer-readable instructions stored in a memory 310 to perform various functions. In some embodiments, a processor 305 includes special-purpose components for modem processing, baseband processing, digital signal processing, or transmission processing.

Examples of a memory device include random access memory (RAM), read-only memory (ROM), or a hard disk. Examples of memory devices include solid state memory and a hard disk drive. In some examples, memory 310 is used to store computer-readable, computer-executable software including instructions that, when executed, cause a processor 305 to perform various functions described herein.

In some cases, the memory 310 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory 310 store information in the form of a logical state.

A display 315 may comprise a conventional monitor, a monitor coupled with an integrated display, an integrated display (e.g., an LCD display), or other means for viewing associated data or processing information. Output devices other than the display 315 can be used, such as printers, other computers or data storage devices, and computer networks. Display 315 is an example of, or includes aspects of, the corresponding element described with reference to FIG. 4.

According to some aspects, frame selection component 320 divides a video into a set of frames including a first frame and a second frame. Frame selection component 320 is an example of, or includes aspects of, the corresponding element described with reference to FIG. 4.

According to some aspects, first neural network 325 generates first object information for a first object in the first frame using a first neural network 325 trained to operate on a first domain. In some aspects, the first domain includes objects that are small in size relative to objects in the second domain. First neural network 325 is an example of, or includes aspects of, the corresponding element described with reference to FIGS. 4 and 6.

According to some aspects, second neural network 330 generates second object information for a second object in the second frame using a second neural network 330 trained to operate on a second domain. In some aspects, the first domain and the second domain overlap. In some aspects, the first object information corresponds to a first computer vision task and the second object information corresponds to a second computer vision task different from the first computer vision task. Second neural network 330 is an example of, or includes aspects of, the corresponding element described with reference to FIGS. 4 and 6.

A neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

An artificial neural network (ANN) is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

A convolutional neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some aspects, data synthesis component 335 generates label data for the video including a first label based on the first object information and a second label based on the second object information. According to some aspects, third neural network 340 detects a third object in a third frame of the video using a third neural network 340 trained to detect objects from a third domain.

According to some aspects, resolution reduction component 345 reduces the resolution of the second frame to obtain a low-resolution version of the second frame, where the second neural network 330 takes the low-resolution version as input and the first neural network 325 takes a high-resolution version of the first frame as input. Resolution reduction component 345 is an example of, or includes aspects of, the corresponding element described with reference to FIG. 4.

According to some aspects, resource optimization component 350 alternately applies the first neural network 325 to a first subset of the set of frames to obtain first label data corresponding to the first domain and applying the second neural network 330 to a second subset of the set of frames to obtain second label data corresponding to the second domain, where the first subset and the second subset alternate according to a temporal ordering of the set of frames. In some examples, resource optimization component 350 identifies available system resources for generating the label data. In some examples, resource optimization component 350 selects a frequency for applying the first neural network 325 and the second neural network 330 based on the available system resources. Resource optimization component 350 is an example of, or includes aspects of, the corresponding element described with reference to FIG. 4.

According to some aspects, training component 355 identifies first training data corresponding to a first domain. In some examples, training component 355 trains a first neural network 325 to perform a first computer vision task using the first training data. In some examples, training component 355 identifies second training data corresponding to a second domain. In some examples, training component 355 trains a second neural network 330 to perform a second computer vision task using the second training data. In some examples, training component 355 alternately applies the first neural network 325 and the second neural network 330 to frames of a video to generate label data corresponding to both the first domain and the second domain. In some aspects, the second training data has a lower resolution than the first training data. In some aspects, the first neural network 325 and the second neural network 330 are trained independently. In some examples, training component 355 identifies third training data corresponding to a third domain. In some examples, training component 355 trains a third neural network 340 to perform a third computer vision task using the third training data. In some examples, training component 355 alternately applies the third neural network 340 to the frames of the video to generate the label data, where the label data includes data corresponding to the third domain. In some aspects, the first training data includes first label data for objects that are small in size relative to second label data for objects in the second domain. In some aspects, the first training data and the second training data overlap.

Figure 4:
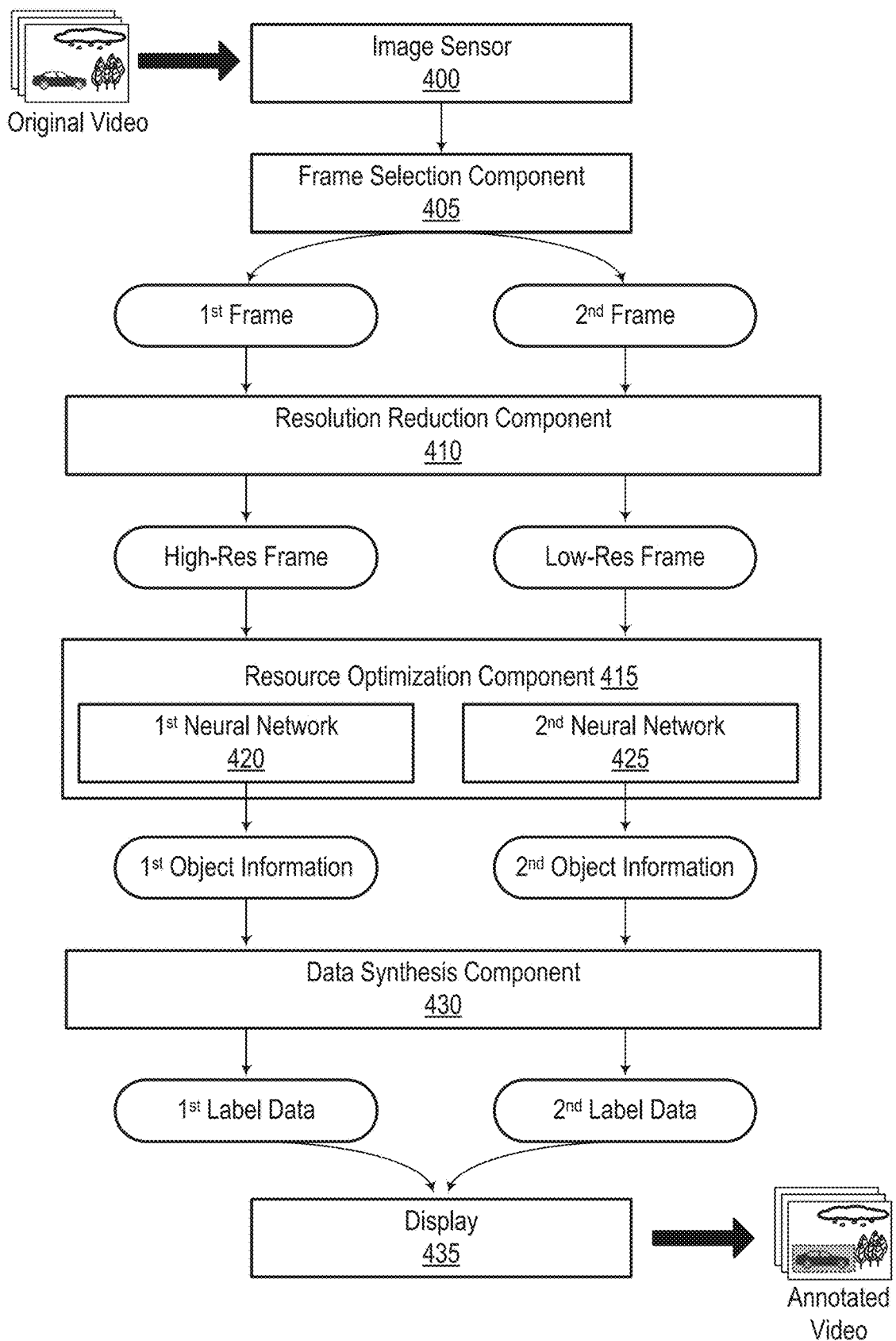
FIGS. 4 and 5 show examples of a process for image processing according to aspects of the present disclosure.

FIG. 4 shows an example of a process for image processing according to aspects of the present disclosure. The example shown includes image sensor 400, frame selection component 405, resolution reduction component 410, resource optimization component 415, data synthesis 430, and display 435. Generally, image sensor 400, frame selection component 405, resolution reduction component 410, resource optimization component 415, data synthesis 430, and display 435 may be implemented via a single device or a combination of devices (e.g., as described in more detail herein, for example, with reference to FIGS. 1-3).

Frame selection component 405 is an example of, or includes aspects of, the corresponding element described with reference to FIG. 3. Resolution reduction component 410 is an example of, or includes aspects of, the corresponding element described with reference to FIG. 3. Resource optimization component 415 is an example of, or includes aspects of, the corresponding element described with reference to FIG. 3. In one aspect, resource optimization component 415 includes first neural network 420 and second neural network 425. First neural network 420 is an example of, or includes aspects of, the corresponding element described with reference to FIGS. 3 and 6. Second neural network 425 is an example of, or includes aspects of, the corresponding element described with reference to FIGS. 3 and 6. Display 435 is an example of, or includes aspects of, the corresponding element described with reference to FIG. 3.

The described apparatuses and techniques enable efficient object detection for video. For example, the described object detection techniques (e.g., separation of detection tasks and segmentation tasks across sequential frames) may efficiently process video with reduced overall computation (e.g., reduced computational effort, reduced computational resources, etc.), which may save runtime, power and bandwidth. In some aspects, the computational saving may be achieved by searching per frame for only a sub domain of the target detection domain. The saving may be further improved since the network can be specifically optimized for the reduced detection target (e.g., such as implementing high resolution for small object detection and low resolution for large object detection).

In addition, the present disclosure enables a flexible video processing model (e.g., where algorithms may be set a detection frequency per scale, per class, and per any other object property). Further, dynamic decision making on detection tasks (e.g., via a network) according to system resources, video content, etc.

Image sensor 400 may capture (e.g., or receive) a video (e.g., a sequence of images). In some cases, a device (e.g., as described with reference to FIGS. 1 and 2) may include image sensor 400. Frame selection component 405 may divide the video (e.g., the original video) into first frame ($1^{st}$ frame) and second frame ($2^{nd}$ frame). Resolution reduction component 410 may reduce the resolution of the second frame to obtain a low-resolution version of the second frame. For instance, resolution reduction component 410 may receive high-resolution video frames (e.g., including the first frame and the second frame), and the resolution reduction component 410 may reduce the resolution of the second frame to obtain a low-resolution version of the second frame while maintaining the first frame's high-resolution.

Next, resource optimization component 415 may identify available system resources (e.g., available hardware resources, system power consumption levels, available power levels, available memory, etc.), and the resource optimization component 415 may select a frequency for applying the first neural network and the second neural network based on the available system resources. For instance, resource optimization component 415 may identify first neural network 420 (for processing the first frame) and second neural network 425 (for processing the second frame).

First neural network 420 may take the first frame as input and may generate first object information for a first object in the first frame (e.g., where the first neural network 420 is trained to operate on a first domain). Second neural network 425 may take the second frame as input and may generate second object information for a second object in the second frame (e.g., where the second neural network 425 is trained to operate on a second domain). For instance, the first domain (processed by first neural network 420) may include objects that are smaller in size relative to objects in the second domain (processed by second neural network 425). In such an example, the first neural network 420 may be a designed shallow neural network that takes a high-resolution version of the first frame as input and may specialize on detecting small objects. Further, the second neural network 425 may be a designed deep neural network that takes a low-resolution version of the second frame as input and may specialize on detecting larger objects (e.g., aspects of which are described in more detail herein, for example, with reference to FIGS. 5 and 6).

Data synthesis component 430 may then generate label data for the video including at least a first label and a second label, where the first label is based on the first object information (e.g., generated via first neural network 420) and the second label is based on the second object information (e.g., generated via second neural network 425).

In some embodiments, frames enter the system one by one and the system outputs results (i.e., detect objects) for each frame individually, for each frame, before the next frame arrives. For example, one of several neural networks may detect a subset of objects in the new frame (according to a decision process of the frame selection component), while other objects are tracked (e.g., using a visual tracker) in the current frame after being detected in a previous frame.

Accordingly, the described techniques may detect and track one or more different classes of objects in the original video frame sequence (e.g., via the generated label data for the video, where the label data may include or indicate detected object information). For instance, display 435 may generate and display an annotated video (e.g., the original video with a bounding box encompassing a moving vehicle).

Object Detection Task Separation Processes

Figure 5:
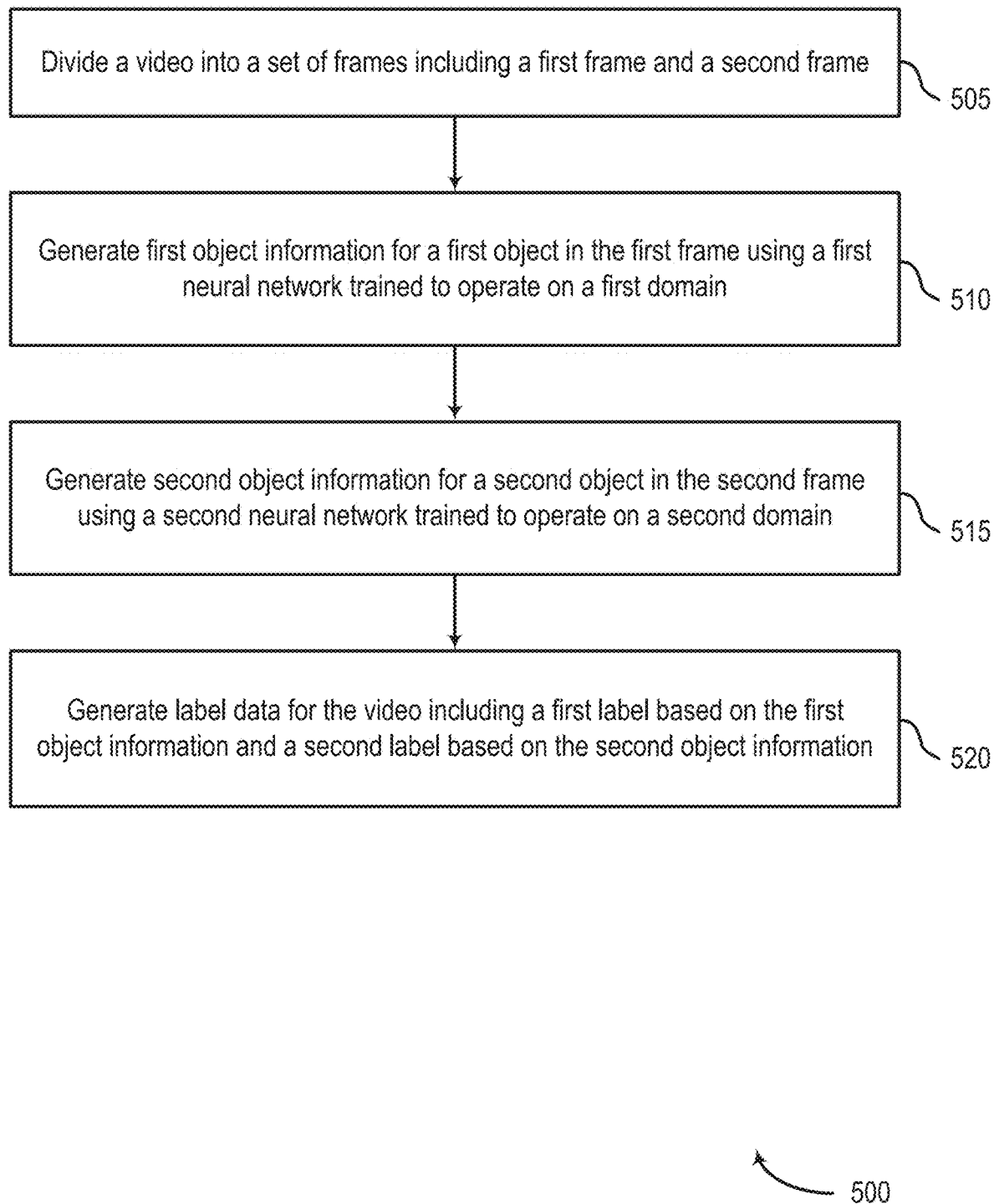

FIG. 5 shows an example of process 500 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for fast object detection in video via scale separation is described. One or more aspects of the method include dividing a video into a plurality of frames including a first frame and a second frame. One or more aspects of the method further include generating first object information for a first object in the first frame using a first neural network trained to operate on a first domain, generating second object information for a second object in the second frame using a second neural network trained to operate on a second domain, and generating label data for the video including a first label based on the first object information and a second label based on the second object information.

At operation 505, the system divides a video into a set of frames including a first frame and a second frame. For example, a sequence of video frames may be divided into frames based on a frequency for applying system resources for object detection techniques (e.g., based on a frame frequency by which one or more neural networks perform object detection tasks on frames of the video sequence). In some cases, the operations of this step refer to, or may be performed by, frame selection component as described with reference to FIGS. 3 and 4.

At operation 510, the system generates first object information for a first object in the first frame using a first neural network trained to operate on a first domain. For example, a first neural network (e.g., a shallow neural network) may be trained to operate on a subdomain of an object detection scheme (e.g., such as on small objects in a search domain, or small features of a search object domain). The first neural network may be specialized for (e.g., designed for, trained for, configured for, etc.) operating on such a first domain, and may generate object information (e.g., object location information, object bounding box(es), etc.) in a first frame accordingly. In some cases, the operations of this step refer to, or may be performed by, first neural network as described with reference to FIGS. 3, 4, and 6.

At operation 515, the system generates second object information for a second object in the second frame using a second neural network trained to operate on a second domain. For example, a second neural network (e.g., a deep neural network) may be trained to operate on a subdomain of an object detection scheme (e.g., such as on large objects in a search domain, or large features of a search object domain). The second neural network may be specialized for (e.g., designed for, trained for, configured for, etc.) operating on such a second domain, and may generate object information (e.g., object location information, object bounding box(es), etc.) in a second frame accordingly. In some cases, the operations of this step refer to, or may be performed by, second neural network as described with reference to FIGS. 3, 4, and 6.

At operation 520, the system generates label data for the video including a first label based on the first object information and a second label based on the second object information. In some cases, the operations of this step refer to, or may be performed by, data synthesis component as described with reference to FIG. 3.

An apparatus, non-transitory computer readable medium, and system for fast object detection in video via scale separation are also described. One or more aspects of the apparatus, non-transitory computer readable medium, and system include dividing a video into a plurality of frames including a first frame and a second frame; generating first object information for a first object in the first frame using a first neural network trained to operate on a first domain; generating second object information for a second object in the second frame using a second neural network trained to operate on a second domain; and generating label data for the video including a first label based on the first object information and a second label based on the second object information.

Some examples of the method, apparatus, non-transitory computer readable medium, and system further include alternately applying the first neural network to a first subset of the plurality of frames to obtain first label data corresponding to the first domain and applying the second neural network to a second subset of the plurality of frames to obtain second label data corresponding to the second domain, wherein the first subset and the second subset alternate according to a temporal ordering of the plurality of frames.

Some examples of the method, apparatus, non-transitory computer readable medium, and system further include reducing the resolution of the second frame to obtain a low-resolution version of the second frame, wherein the second neural network takes the low-resolution version as input and the first neural network takes a high-resolution version of the first frame as input.

Some examples of the method, apparatus, non-transitory computer readable medium, and system further include detecting a third object in a third frame of the video using a third neural network trained to detect objects from a third domain.

In some aspects, the first domain includes objects that are small in size relative to objects in the second domain. In some aspects, the first domain and the second domain overlap. In some aspects, the first object information corresponds to a first computer vision task and the second object information corresponds to a second computer vision task different from the first computer vision task.

Some examples of the method, apparatus, non-transitory computer readable medium, and system further include identifying available system resources for generating the label data. Some examples further include selecting a frequency for applying the first neural network and the second neural network based on the available system resources.

Figure 6:
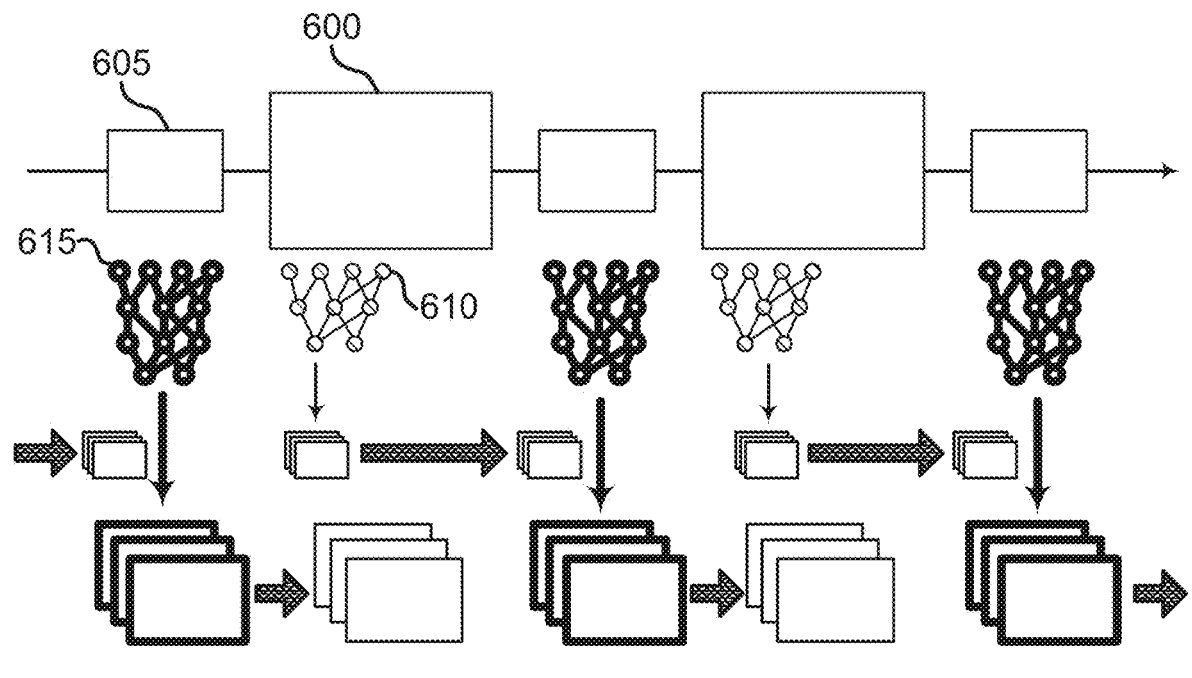
FIG. 6 shows an example of a process for detecting an object in video according to aspects of the present disclosure.
Figure 6:
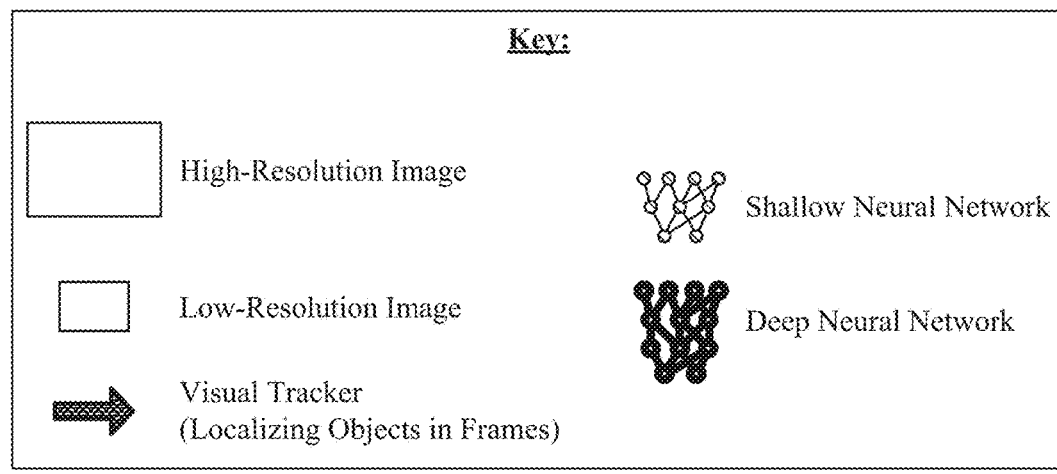

FIG. 6 shows an example of a process for detecting an object in video according to aspects of the present disclosure. The example shown includes first frame 600, second frame 605, first neural network 610, and second neural network 615. First neural network 610 is an example of, or includes aspects of, the corresponding element described with reference to FIGS. 3 and 4. Second neural network 615 is an example of, or includes aspects of, the corresponding element described with reference to FIGS. 3 and 4.

The techniques described herein may enable efficient object detection and object segmentation video processing via separation of detection tasks and segmentation tasks across sequential frames (e.g., according to the target object size). Such techniques may decrease the computational load via application of different processing techniques to sequential frames in a video stream.

FIG. 6 illustrates an example of a generalized object detection flow for video. In this example large objects are detected every other frame in low resolution image (e.g., in a low-resolution second frame 605) with a deep neural network (e.g., second neural network 615), while small objects are detected on the other half of the frames, at higher resolution (e.g., such as high-resolution first frame 600) and using a shallower network (e.g., first neural network 610). In some of such examples, the "small objects" and "large objects" subdomains may overlap. The patterned arrows represent a visual tracker localizing (e.g., tracking) objects in frames where they are not searched for (e.g., to leverage redundant information across certain frames in a frame sequence, such as across consecutive frames).

Generally, as described herein, different processing schemes may be implemented across consecutive frames and the redundancy of video frames may be leveraged to enable more efficient object detection and object segmentation using reduced computational resources. In some aspects, the domain of objects that an object detection system targets to detect may be broken (e.g., separated) into subdomains. For instance, object domains such as the target object classes (e.g., cats, dogs, humans, food plates, etc.), object's size in the image, object's rotation angle, and other properties may be classified and separated into subdomains. In many scenarios, there may be no need to detect an object from the full domain of objects in every frame. As described herein, each frame may be searched for a subdomain of the objects, and full target domain of the object may be covered (e.g., accounted for) over several sequential frames (e.g., as separation by object scale may be especially efficient). As an example, detection of small objects can benefit from using a higher image resolution compared to detection of large objects. On the other hand, detection of large objects can benefit from using a deeper ANN compared to detection of small objects.

In order to compensate for the narrow-down of the objects' search domain in some (or all) of the frame, a visual tracker may be used to track the objects from the last frame in which they were detected. A visual object tracker may use the detection result of an object in frame n in order to detect the same object in consecutive frames n+1, n+2, . . . , etc. (e.g., especially in the subsequent frame n+1) faster, and often more accurately, compared to a performing a full detection scheme processing the whole frame.

Separating the Search Domain Across Video Stream Frames

In some examples (e.g., such as in some cases of the example of FIG. 6) a target object domain may be separated into two subdomains (e.g., according to their scale), and object detection may be executed in an interleaved manner (e.g., where one network processes the even frames in a video stream while another network processes the odd frames in the video stream). In some examples, there may be more than two subdomains, and then the cadence is longer than two.

Moreover, the different networks can be executed at different frequencies (e.g., every other frame, once every three frames, etc.). For example, running a network detecting large objects at even frames and interleaving the odd frames between a network for medium objects and a network for small ones.

In some implementations, the subdomains may overlap (e.g., one network may detect all objects at all scales while a second network may detect only medium-large objects of some/all of the classes).

In some aspects, decisions about which network to activate can be done online according to system resources. For example, if one, heavier, network (e.g., second neural network 615) searches for all object scales and a second, lighter, network (e.g., first neural network 610) searches only for large objects, the first heavy network may be used only once every N frames, where N may increase when the available system resources are reduced.

In some aspects, decisions about which network is activated may be done online according to the video content (e.g., if many small faces are detected within a frame, there may be no reason to run the network for detecting very large faces very often).

Search Domain Optimization

Separating the search domain across sequential frames and narrowing down the search domain per frame allows the use of neural networks that are more specifically tailored for more limited tasks. In frames where the search domain is limited to small objects, a higher resolution image may be used (e.g., giving the network as much visual details as possible). In addition, detection of small objects may suffice in a relatively shallow network).

On the other hand, in frames where the target search domain consists of large objects, a relatively lower resolution image may be used (e.g., as high-resolution images may include too many high-frequency features, which may be unnecessary for detection and demand excessive computational effort and resources). In addition, detection of large object may demand a relatively deep network in order to allow the deeper neurons large receptive fields, which further increases the computational problem (e.g., excess computational resources) caused by processing of many pixels.

In some cases, sometimes it may be efficient to separate detection tasks and segmentation tasks across sequential frames according to both scale and object size. As an example, a video processing system may implement a network that detects humans of a certain size range and human faces of matching size (e.g., greater than a sixth of the minimal human size).

In some cases, detection tasks and segmentation tasks across sequential frames may be separated according to class. For instance, a video processing system may implement a network optimized for landscape aspect ratio classes (e.g., horizontal text) and a network optimized for portrait aspect ratio classes (e.g., person).

In some cases, detection tasks and segmentation tasks across sequential frames may be separated according to in-plate rotation (e.g., a video processing system may implement four separate networks for objects rotated at 90° intervals).

In some scenarios, video processing systems may not separate the search domain between networks (e.g., a video processing system may implement two networks having the same search domain). In such an example, the two networks may still be optimized differently and may have different characteristics. For instance, two networks that search for the entire domain of classes and scales may be implemented, where the two networks may have different input resolutions. That way computational resources and effort may be reduced (e.g., compared to all frames processed at higher resolution), while accuracy of detection tasks and segmentation tasks may remain high (e.g., in some cases, the larger resolution frame may have better accuracy for small objects).

In some aspects, mixed resolution implementations (e.g., as described above) are described in the context of object detection applications for illustrative purposes, which is not intended to be limiting in terms of the scope of the present disclosure. For instance, such implementations may be applicable to semantic or panoptic segmentation, face or body key point detection, three-dimensional (3D) reconstruction, image to text, and many other computer vision applications.

Training Specialized Object Detection Networks

Figure 7:
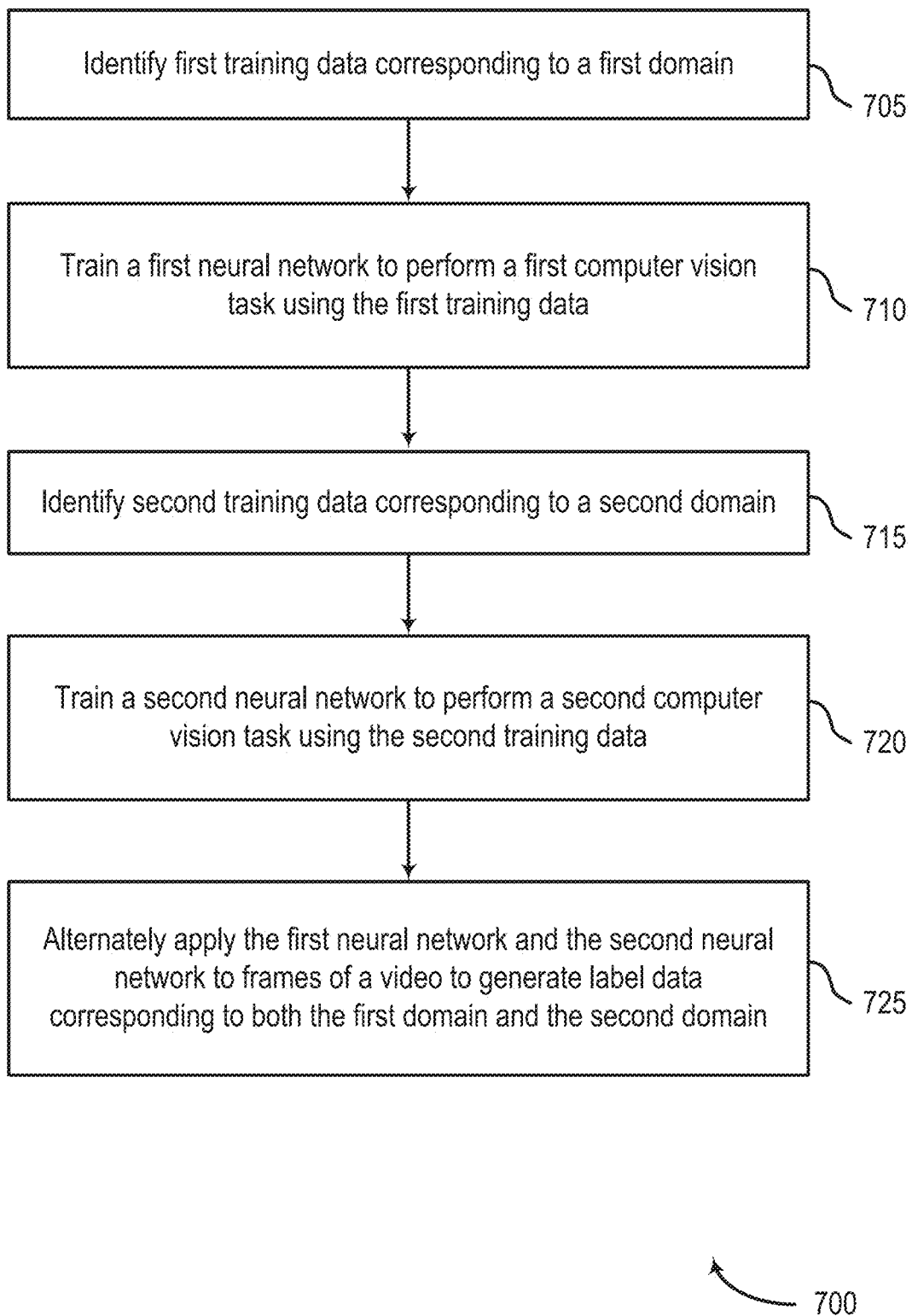
FIG. 7 shows an example of a process for image processing according to aspects of the present disclosure.

FIG. 7 shows an example of process 700 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for fast object detection in video via scale separation is described. One or more aspects of the method include identifying first training data corresponding to a first domain and training a first neural network to perform a first computer vision task using the first training data. One or more aspects of the method further include identifying second training data corresponding to a second domain and training a second neural network to perform a second computer vision task using the second training data. One or more aspects of the method also include alternately applying the first neural network and the second neural network to frames of a video to generate label data corresponding to both the first domain and the second domain.

For instance, during a training process, neural network weights are adjusted to improve the accuracy of the neural network result output (i.e., by minimizing a loss function which corresponds in some way to the difference between the current result and the target result). The weight of a neural network edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

The term "loss function" refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

At operation 705, the system identifies first training data corresponding to a first domain. In some cases, the operations of this step refer to, or may be performed by, training component as described with reference to FIG. 3. In some cases, the operations of this step refer to, or may be performed by, image processing apparatus as described with reference to FIGS. 1 and 3.

At operation 710, the system trains a first neural network to perform a first computer vision task using the first training data. In some cases, the operations of this step refer to, or may be performed by, training component as described with reference to FIG. 3. In some cases, the operations of this step refer to, or may be performed by, first neural network as described with reference to FIGS. 3, 4, and 6.

At operation 715, the system identifies second training data corresponding to a second domain. In some cases, the operations of this step refer to, or may be performed by, training component as described with reference to FIG. 3. In some cases, the operations of this step refer to, or may be performed by, image processing apparatus as described with reference to FIGS. 1 and 3.

At operation 720, the system trains a second neural network to perform a second computer vision task using the second training data. In some cases, the operations of this step refer to, or may be performed by, training component as described with reference to FIG. 3. In some cases, the operations of this step refer to, or may be performed by, second neural network as described with reference to FIGS. 3, 4, and 6.

At operation 725, the system alternately applies the first neural network and the second neural network to frames of a video to generate label data corresponding to both the first domain and the second domain. In some cases, the operations of this step refer to, or may be performed by, resource optimization component as described with reference to FIGS. 3 and 4.

An apparatus, non-transitory computer readable medium, and system for fast object detection in video via scale separation are also described. One or more aspects of the apparatus, non-transitory computer readable medium, and system include identifying first training data corresponding to a first domain; training a first neural network to perform a first computer vision task using the first training data; identifying second training data corresponding to a second domain; training a second neural network to perform a second computer vision task using the second training data; and alternately applying the first neural network and the second neural network to frames of a video to generate label data corresponding to both the first domain and the second domain.

In some aspects, the second training data has a lower resolution than the first training data. In some aspects, the first neural network and the second neural network are trained independently.

Some examples of the method, apparatus, non-transitory computer readable medium, and system further include identifying third training data corresponding to a third domain. Some examples further include training a third neural network to perform a third computer vision task using the third training data. Some examples further include alternately applying the third neural network to the frames of the video to generate the label data, wherein the label data includes data corresponding to the third domain.

In some aspects, the first training data includes first label data for objects that are small in size relative to second label data for objects in the second domain. In some aspects, the first training data and the second training data overlap.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing, comprising:
dividing a video into a plurality of frames including a first frame and a second frame;
selecting the first frame for processing with a first neural network and the second frame for processing with a second neural network based on an ordering of the plurality of frames;
generating first object information for a first object in the first frame by performing a first computer vision task using the first neural network;
generating second object information for a second object in the second frame by performing a second computer vision task using the second neural network; and
generating label data for the video including a first label based on the first object information and a second label based on the second object information.

2. The method of claim 1, further comprising:
alternately applying the first neural network to a first subset of the plurality of frames to obtain first label data corresponding to the first computer vision task and applying the second neural network to a second subset of the plurality of frames to obtain second label data corresponding to the second computer vision task, wherein the first subset and the second subset alternate according to a temporal ordering of the plurality of frames.

3. The method of claim 1, further comprising:
reducing a resolution of the second frame to obtain a low-resolution version of the second frame, wherein the second neural network takes the low-resolution version as input and the first neural network takes a high-resolution version of the first frame as input.

4. The method of claim 1, further comprising:
detecting a third object in a third frame of the video using a third neural network trained to detect objects by performing a third computer vision task different from the first computer vision task and second computer vision task.

5. The method of claim 1, wherein:
the first computer vision task generates object information for objects that are small in size relative to objects which have object information generated by the second computer vision task.

6. The method of claim 1, wherein:
the first computer vision task and the second computer vision task overlap,
the first frame is a high-resolution frame,
the first computer vision task is performed based on the first frame to detect objects that are small in size,
the second frame is a low-resolution frame, and
the second computer vision task is performed based on the second frame to detect objects that are large in size.

7. The method of claim 1, wherein:
the second computer vision task is different from the first computer vision task.

8. The method of claim 1, further comprising:
identifying available system resources for generating the label data; and
selecting a frequency for applying the first neural network and the second neural network based on the available system resources.

9. A method for training a machine learning model, the method comprising:
identifying first training data corresponding to a first computer vision task;
training a first neural network to perform the first computer vision task using the first training data;
identifying second training data corresponding to a second computer vision task;
training a second neural network to perform the second computer vision task using the second training data; and
alternately applying the first neural network and the second neural network to different frames of a video to generate label data corresponding to the first computer vision task and the second computer vision task, respectively.

10. The method of claim 9, wherein:
the second training data has a lower resolution than the first training data.

11. The method of claim 9, wherein:
the first neural network and the second neural network are trained independently.

12. The method of claim 9, further comprising:
identifying third training data corresponding to a third computer vision task;
training a third neural network to perform the third computer vision task using the third training data; and
alternately applying the third neural network to the frames of the video to generate the label data, wherein the label data includes data corresponding to the third computer vision task.

13. The method of claim 9, wherein:
the first training data includes first label data for objects that are small in size relative to objects for which label data is generated by the second computer vision task.

14. The method of claim 9, wherein:
the first training data and the second training data overlap,
the first computer vision task is performed based on a first frame which is a high-resolution frame to detect objects that are small in size, and
the second computer vision task is performed based on a second frame which is a low-resolution frame to detect objects that are large in size.

15. A system for image processing, comprising:
a frame selection component to divide a video into a plurality of frames including a first frame and a second frame based on a temporal ordering of the plurality of frames;
a first neural network configured to generate first object information for a first object in the first frame by performing a first computer vision task;
a second neural network configured to generate second object information for a second object in the second frame by performing a second computer vision task; and
a data synthesis component configured to generate label data for the video including a first label based on the first object information and a second label based on the second object information.

16. The system of claim 15, further comprising:
a third neural network configured to generate third object information for a third object in a third frame, wherein the third neural network is trained to perform a third computer vision task different from the first computer vision task and second computer vision task.

17. The system of claim 15, further comprising:
a resolution reduction component configured to reduce a resolution of the second frame to obtain a low-resolution version of the second frame, wherein the second neural network takes the low-resolution version as input and the first neural network takes a high-resolution version of the first frame as input.

18. The system of claim 15, further comprising:
a resource optimization component configured to identify available system resources for generating the label data and to select a frequency for applying the first neural network and the second neural network based on the available system resources.

19. The system of claim 15, wherein:
the second neural network has fewer parameters than the first neural network,
the first frame is a high-resolution frame,
the first computer vision task is performed based on the first frame to detect objects that are small in size,
the second frame is a low-resolution frame, and
the second computer vision task is performed based on the second frame to detect objects that are large in size.

20. The system of claim 15, further comprising:
a training component configured to train the first neural network and the second neural network.

* * * * *